US012032381B2

United States Patent
Kawai et al.

(10) Patent No.: US 12,032,381 B2
(45) Date of Patent: Jul. 9, 2024

(54) ACCOMPANYING MOBILE BODY

(71) Applicant: HONDA MOTOR CO., LTD., Tokyo (JP)

(72) Inventors: Toru Kawai, Wako (JP); Hiroki Mukai, Wako (JP); Hiroto Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 339 days.

(21) Appl. No.: 17/421,949

(22) PCT Filed: Jan. 22, 2019

(86) PCT No.: PCT/JP2019/001862
§ 371 (c)(1),
(2) Date: Jul. 9, 2021

(87) PCT Pub. No.: WO2020/152778
PCT Pub. Date: Jul. 30, 2020

(65) Prior Publication Data
US 2022/0026914 A1    Jan. 27, 2022

(51) Int. Cl.
*G05D 1/00* (2024.01)
*G06Q 10/087* (2023.01)
(Continued)

(52) U.S. Cl.
CPC ......... *G05D 1/0223* (2013.01); *G05D 1/0231* (2013.01); *G06Q 10/087* (2013.01);
(Continued)

(58) Field of Classification Search
CPC .. G05D 1/0223; G05D 1/0231; G05D 1/0016; G05D 1/0246; G05D 2201/0216;
(Continued)

(56) References Cited

U.S. PATENT DOCUMENTS 9,836,117 B2* 12/2017 Shapira ................ G05D 1/0038
2010/0222925 A1* 9/2010 Anezaki ............... G05D 1/0251
700/253
(Continued)

FOREIGN PATENT DOCUMENTS

CN    108528484    9/2018
JP    2006-146491    6/2006
(Continued)

OTHER PUBLICATIONS

Japanese Office Action dated Jan. 11, 2022, Application No. 2020-567704; English machine translation included, 5 pages.
(Continued)

*Primary Examiner* — Dale W Hilgendorf
*Assistant Examiner* — Frank T Glenn, III
(74) *Attorney, Agent, or Firm* — Rankin, Hill & Clark LLP

(57) ABSTRACT

An accompanying mobile body in which a response to an abrupt change in a traveling direction of a user is restrained from being delayed. A movement state recognition section recognizes a moving direction and a moving speed of a user. A predicted location calculation section calculates a predicted location of the user after a first predetermined time period based on the moving direction and the moving speed of the user. An accompanying control section performs accompanying control to cause an accompanying mobile body to move by a traveling unit toward a target location of accompanying that is a location apart from the predicted location by a specified distance in a specified direction.

7 Claims, 19 Drawing Sheets

(51) Int. Cl.
  *G06Q 20/20* (2012.01)
  *G06Q 20/32* (2012.01)
  *G06Q 30/0601* (2023.01)

(52) U.S. Cl.
  CPC ......... *G06Q 20/202* (2013.01); *G06Q 20/204* (2013.01); *G06Q 20/322* (2013.01); *G06Q 30/0633* (2013.01); *G06Q 30/0639* (2013.01)

(58) Field of Classification Search
  CPC .. G06Q 10/087; G06Q 20/202; G06Q 20/204; G06Q 20/322; G06Q 30/0633; G06Q 30/0639
  See application file for complete search history.

(56) References Cited

U.S. PATENT DOCUMENTS

| | | | | |
|---|---|---|---|---|
| 2016/0114811 | A1* | 4/2016 | Matsuno | B60W 10/18 701/23 |
| 2016/0188977 | A1* | 6/2016 | Kearns | H04N 7/185 348/113 |
| 2017/0269587 | A1* | 9/2017 | Hong | G06F 3/0362 |
| 2017/0368691 | A1* | 12/2017 | Li | B25J 13/089 |
| 2018/0246525 | A1* | 8/2018 | Hiramatsu | G05D 1/0282 |
| 2018/0259971 | A1 | 9/2018 | Nishimura | |
| 2019/0337514 | A1* | 11/2019 | Natsumi | B60W 30/12 |
| 2020/0061822 | A1* | 2/2020 | Luo | B25J 13/08 |

FOREIGN PATENT DOCUMENTS

| | | |
|---|---|---|
| JP | 2006-155039 | 6/2006 |
| JP | 2007-213367 | 8/2007 |
| JP | 2010-061316 | 3/2010 |
| JP | 2014-211704 | 11/2014 |

OTHER PUBLICATIONS

International Search Report, dated Apr. 2, 2019, 1 page.
Written Opinion of the International Searching Authority Mailing dated Apr. 2, 2019, 4 pages.
European Search Report dated Nov. 8, 2021, 10 pages.
International Preliminary Report on Patentability dated Aug. 5, 2021, 6 pages.

* cited by examiner

FIG.6

DISH NAME: PORK CURRY [FOR 4 SERVINGS] — 111

| CANDIDATE MATERIAL | REQUIRED AMOUNT | STOCK AT HOME | SELECTION |
|---|---|---|---|
| CURRY ROUX | SERVINGS | SERVINGS | × |
| PORK | 300g | 0g | ○ |
| POTATO | POTATOES (POTATO) | POTATO | ○ |
| CARROT | MEDIUM CARROT (CARROTS) | MEDIUM CARROTS | × |
| ONION | ONIONS | ONIONS | ○ |
| GARLIC | CLOVES | CLOVES | × |
| GINGER | 5g | 0g | × |
| BUTTER | 5g | 0g | ○ |
| ⋮ | ⋮ | ⋮ | ⋮ |

SELECTION DETERMINATION — 113

FIG.9

| No. | SELECTED MATERIAL | DISPLAY LOCATION |
|---|---|---|
| 1 | PORK | (xa,ya) |
| 2 | POTATO | (xb,yb) |
| 3 | ONION | (xc,yc) |
| 4 | BUTTER | (xd,yd) |

FIG.13

PURCHASED ARTICLE LIST: PORK CURRY [FOR 4 SERVINGS] — 161

| No. | MATERIAL NAME | REQUIRED AMOUNT | PURCHASED AMOUNT | PURCHASE PRICE |
|---|---|---|---|---|
| 1 | PORK | 300g | 300g | ¥300 |
| 2 | POTATO | POTATOES | POTATOES | ¥200 |
| 3 | ONION | ONIONS | ONIONS | ¥120 |
| 4 | BUTTER | 5g | 1 PACKET | ¥500 |
| : | : | : | : | : |
| SUM OF PURCHASE PRICES | | | ¥1,500 | |

CARD SETTLEMENT — 163

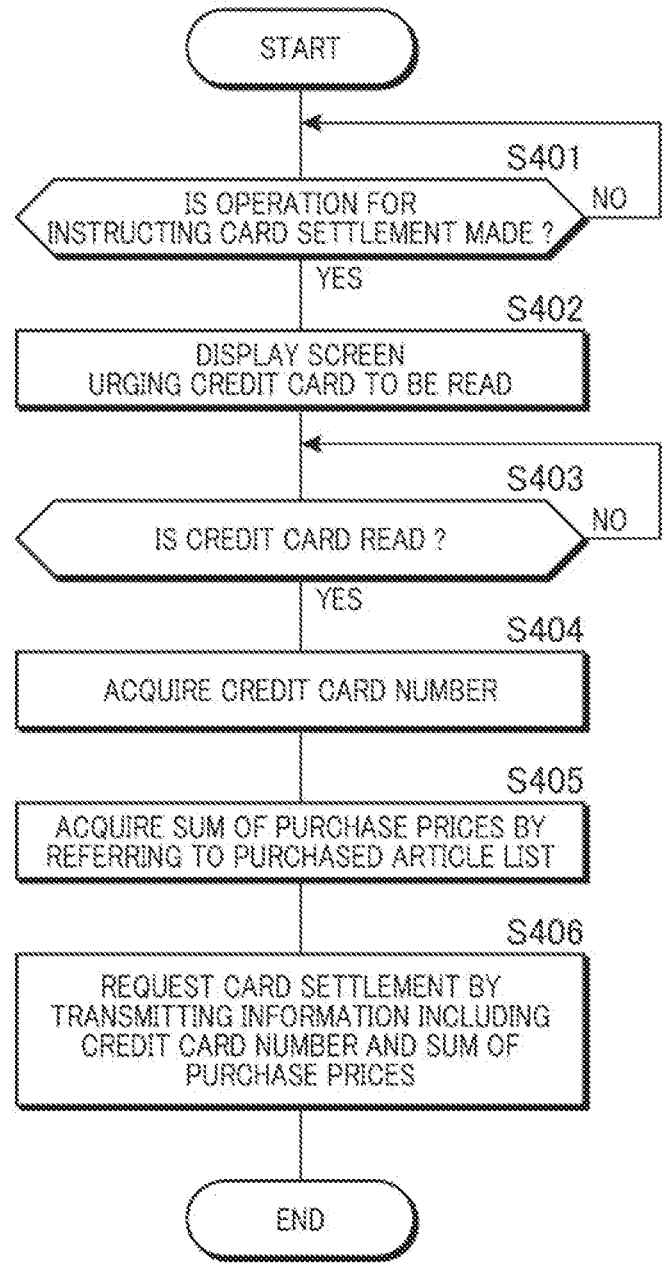

ACCOMPANYING MOBILE BODY

TECHNICAL FIELD

The present invention relates to an accompanying mobile body that moves while accompanying a user.

BACKGROUND ART

Conventionally, as an accompanying mobile body that moves while accompanying a user, for example, Patent Literature 1 describes a store robot including a function of traveling following a user in order to assist the user in purchasing products at a store such as a supermarket. The store robot described in Patent Literature 1 shoots the user using an image sensor, and calculates a distance of the user from the store robot. The store robot is caused to follow the user by driving and controlling wheels through a movement mechanism such that a distance between the store robot and the user is kept constant.

CITATION LIST

Patent Literature

[Patent Literature 1]
Japanese Patent Laid-Open No. 2006-155039

SUMMARY OF INVENTION

Technical Problem

The conventional accompanying mobile body shoots a user using an image sensor to calculate a distance of the user from the accompanying mobile body. The accompanying mobile body is caused to follow the user such that a distance between the accompanying mobile body and the user is kept constant. However, when the distance between the user and the accompanying mobile body is thus found from images shot by the image sensor to cause the accompanying mobile body to follow the user, an inconvenience arises that a response of the accompanying mobile body is easily delayed when the user abruptly changes a traveling direction.

The present invention is made in light of the above background, and an object of the present invention is to provide an accompanying mobile body a response to an abrupt change in a traveling direction of a user of which is restrained from being delayed.

Solution to Problem

As a configuration to achieve the above object, an accompanying mobile body can be provided that includes a propelling unit and accompanies a user, the accompanying mobile body including: a movement state recognition section that recognizes a moving direction and a moving speed of the user; a predicted location calculation section that calculates a predicted location of the user after a first predetermined time period based on the moving direction and the moving speed of the user recognized by the movement state recognition section; and an accompanying control section that performs accompanying control to cause the accompanying mobile body to move by the propelling unit toward a target location of accompanying that is a location apart from the predicted location by a specified distance in a specified direction.

The accompanying mobile body may further include a motion recognition section that recognizes a motion of the user, and the predicted location calculation section may be configured to change a time interval at which the predicted location is calculated in response to the motion of the user recognized by the motion recognition section.

In the accompanying mobile body, the predicted location calculation section may be configured to shorten the time interval when the motion recognition section recognizes a motion made by the user for changing a traveling direction by an angle not smaller than a first predetermined angle.

In the accompanying mobile body, the predicted location calculation section may be configured to shorten the time interval when the motion recognition section recognizes a motion made by the user for changing a direction of a body or head by an angle not smaller than a second predetermined angle.

In the accompanying mobile body, the predicted location calculation section may be configured to shorten the time interval when the motion recognition section recognizes a motion made by the user for changing a direction of a line of sight by an angle not smaller than a third predetermined angle.

The accompanying mobile body may further include a turn angle recognition section that recognizes a turn angle of the user, and the accompanying control section may be configured to change, when causing the accompanying mobile body to move through the accompanying control, a moving speed of the accompanying mobile body depending on the turn angle of the user recognized by the turn angle recognition section.

The accompanying mobile body may further include a turn angle recognition section that recognizes a turn angle of the user, and the specified direction may be a forward direction of the user, and the accompanying control section may be configured to change, when causing the accompanying mobile body to overtake the user and move and reach the front of the user in response to turning of the user through the accompanying control, an interval between the accompanying mobile body and the user when the accompanying mobile body overtakes the user depending on the turn angle of the user recognized by the turn angle recognition section.

The accompanying mobile body may further include a turn angle recognition section that recognizes a turn angle of the user, and the specified direction may be a forward direction of the user, and the accompanying control section may be configured to change, when causing the accompanying mobile body to overtake the user and move and reach the front of the user in response to turning of the user through the accompanying control, a moving speed of the accompanying mobile body when the accompanying mobile body overtakes the user depending on the turn angle of the user recognized by the turn angle recognition section.

In the accompanying mobile body, the accompanying control section may be configured to maintain, when the accompanying mobile body overtakes the user, a state where the accompanying mobile body and the user move in parallel for a second predetermined time period, and then gradually increase a moving speed of the accompanying mobile body, to cause the accompanying mobile body to overtake the user and move and reach the front of the user.

Advantageous Effect of Invention

According to the accompanying mobile body, the moving direction and the moving speed of the user are recognized by the movement state recognition section, and the predicted location of the user after the first predetermined time period is recognized based on the moving direction and the moving speed of the user by the predicted location calculation section. The accompanying control section performs the accompanying control to cause the accompanying mobile body to move by the propelling unit toward the target location of accompanying that is the location apart from the predicted location by the specified distance in the specified direction. Thus, when the moving direction and the moving speed of the user are abruptly changed, a predicted location of the user corresponding to the change is calculated, and accompanying control to cause the accompanying mobile body to move to the target location of accompanying based on the predicted location is performed. Therefore, the accompanying mobile body can be caused to accompany the user by restraining its response to an abrupt change in a traveling direction of the user from being delayed.

BRIEF DESCRIPTION OF DRAWINGS

FIG. 6 is an illustrative diagram of a to-be-purchased material selection screen.

FIG. 9 is an illustrative diagram of display locations of selected materials.

FIG. 13 is an illustrative diagram of a purchased article list.

FIG. 19 is a flowchart of processing of requesting to settle purchased articles by card.

DESCRIPTION OF EMBODIMENTS

1. Usage Form of Shopping Cart

Figure 1:
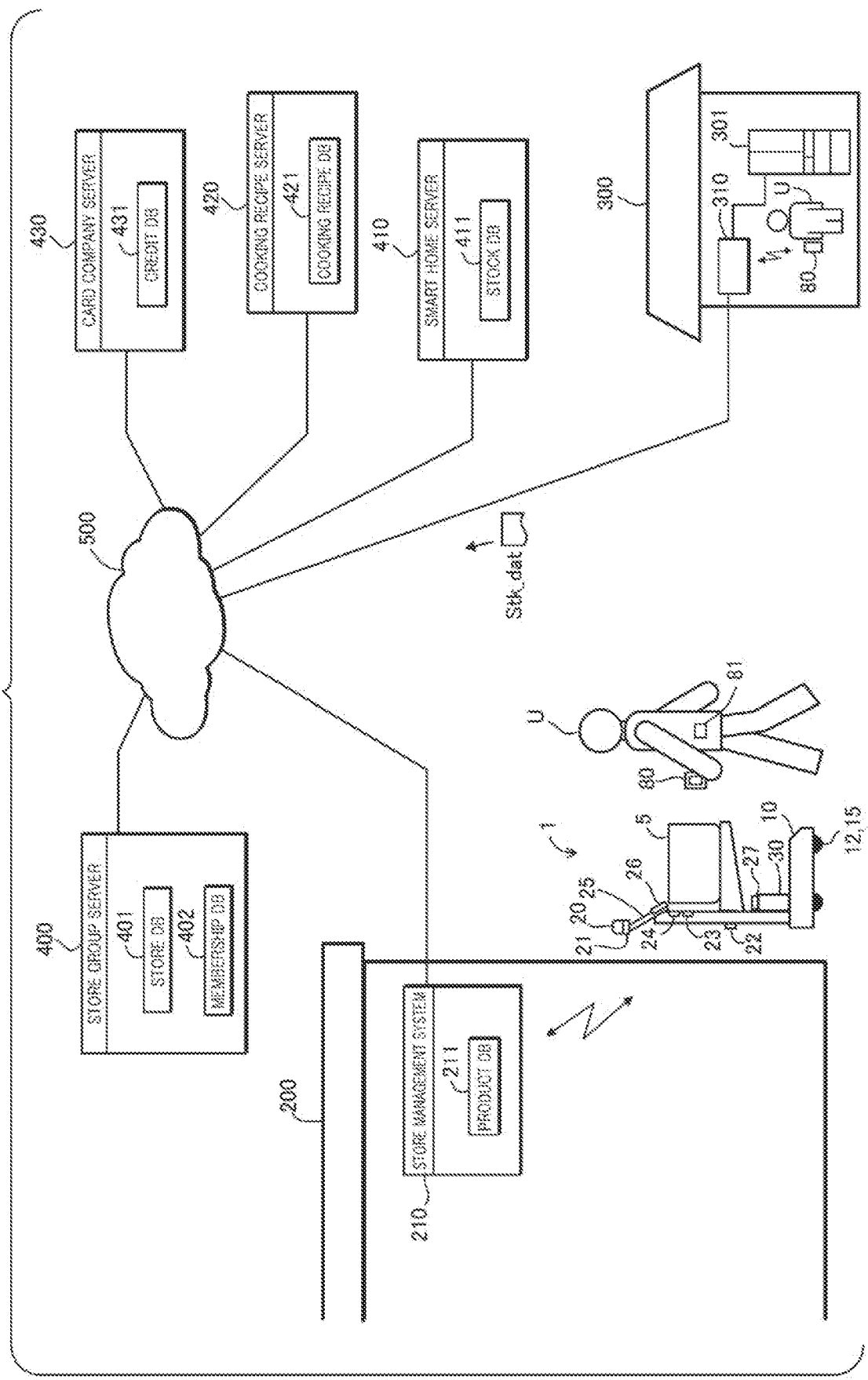
FIG. 1 is an illustrative diagram showing a usage form of a shopping cart that is an accompanying mobile body according to an embodiment.

A usage form of an accompanying mobile body according to an embodiment will be described with reference to FIG. 1. The accompanying mobile body according to the present embodiment is a shopping cart 1 and, in a store 200, accompanies a user U who is a shopper, moves in a self-propelled manner in the store 200, and assists the user U in shopping.

The shopping cart 1 includes a basket 5 in which a product is contained, a traveling unit 10, an omnidirectional camera 20, a LiDAR (Light Detection and Ranging) 21, a forward camera 22, a speaker 23, a microphone 24, a touch panel 25, a card reader 26, a communication unit 27, and a control unit 30.

Here, the omnidirectional camera 20, the LiDAR 21, and the forward camera 22 are provided to constantly observe a bearing and a distance of the user U relative to the shopping cart 1, and an obstacle existing in front of the shopping cart 1. As other configurations to perform such constant observation, for example, configurations (a) to (c) described below can also be adopted.

(a) The omnidirectional camera 20 is replaced with a camera (an oscillating camera) that follows the user U by changing shooting directions through a motor oscillating mechanism.

(b) The LiDAR 21 is eliminated by using a compound-eye camera for the oscillating camera in (a) to make it possible to measure the distance.

(c) The LiDAR 21 is eliminated by configuring the omnidirectional camera 20 by using a compound-eye camera.

The traveling unit 10 includes a left drive wheel 12 and a right drive wheel 15 and causes the shopping cart 1 to travel in a self-propelled manner. The traveling unit 10 corresponds to a propelling unit of the present invention. The omnidirectional camera 20 shoots surroundings of the shopping cart 1 in a 360-degree range. The LiDAR 21 detects a location of an object in the surroundings (a direction of the object relative to the shopping cart 1 and a distance from the shopping cart 1 to the object) by scanning the surroundings of the shopping cart 1 in the 360-degree range. Thus, the bearing and the distance of the user U can be constantly identified by the LiDAR 21 while the user U is recognized by the omnidirectional camera 20.

The forward camera 22 shoots a front (a traveling direction) of the shopping cart 1. Note that the function of the forward camera 22 may be replaced by the omnidirectional camera 20. The speaker 23 outputs an audio guidance and the like to the user U. The microphone 24 receives an input of an audio instruction and the like made by the user U. The touch panel 25 is configured in such a manner that touch switches are arranged on a surface of a flat display such as a liquid crystal display, and detects a location of a touch made by the user U and displays various screens.

The card reader 26 reads information recorded on a membership card 81 for the store 200 owned by the user U. The membership card 81 in the present embodiment includes a credit card function. The communication unit 27 wirelessly communicates with a store management system 210 provided to the store 200 and with a communication terminal 80 such as a smartphone owned by the user U. The control unit 30 controls entire operation of the shopping cart 1 and acquires various information by communicating via the communication unit 27 with the store management system 210 provided to the store 200.

The store management system 210 communicates with a store group server 400, a smart home server 410, a cooking recipe server 420, and a card company server 430 via a communication network 500. The store management system 210 includes a product DB (data base) 211 in which prices of products that are sold in the store 200 are recorded. The store group server 400 includes a store DB (data base) 401 in which information on each store operated by a retailer that operates the store 200 is recorded, and a membership DB 402 in which information on members who use each store is recorded. In the membership DB 402, a profile of each user who is registered as a member of each store and a membership ID (identification) issued for the user are recorded.

The smart home server 410 receives ingredient stock data Stk_dat transmitted from a smart home unit 310 installed in a home 300 of the user U and records the ingredient stock data Stk_dat in a stock DB 411. The smart home unit 310 recognizes a stock state of ingredients contained in a refrigerator 301, a storage shelf (not shown), and the like placed in the home 300 of the user U through image recognition by a camera (not shown), and generates the ingredient stock data Stk_dat. Note that the stock state of the ingredients may be transmitted from the communication terminal 80 to the smart home unit 310 in such a manner that communication is performed between the smart home unit 310 and the communication terminal 80 owned by the user U and the user U inputs the stock state of the ingredients by operating the communication terminal 80.

The smart home server 410 records the ingredient stock data Stk_dat, which indicates stocks of the ingredients at the home 300 of the user U, in the stock DB 411 in association with the membership ID of the user U. For each of other users, the smart home server 410 records ingredient stock data Stk_dat indicating a stock state of ingredients at a home of the user in the stock DB 411 in association with a membership ID of the user.

When the smart home server 410 receives a request to transmit the stock state with the specified membership ID from the store management system 210, the smart home server 410 transmits the ingredient stock data Stk_dat that is recorded in the stock DB 411 in association with the specified membership ID to the store management system 210. The cooking recipe server 420 includes a cooking recipe DB 421 in which recipe data on various dishes is recorded, and transmits recipe information on a dish requested by the store management system 210 to the store management system 210.

The card company server 430 is operated by a settlement service provider for payment by credit card, and includes a credit DB 431 in which credit information on each credit card member is recorded in association with a credit card number that is identification information issued to the credit card member. The card company server 430 includes a terminal apparatus function. When the user U selects payment by credit card, the control unit 30 of the shopping cart 1 reads the credit card number on the membership card 81 through the card reader 26.

The control unit 30 then transmits settlement request information indicating the credit card number and an amount to be paid to the card company server 430. In response to the settlement request information, the card company server 430 performs processing of paying for a purchased product by the membership card 81. The settlement request information from the control unit 30 to the card company server 430 may be transmitted via the store management system 210, or may be directly transmitted from the control unit 30 to the store management system 210.

2. Configuration of Shopping Cart

Figure 2:
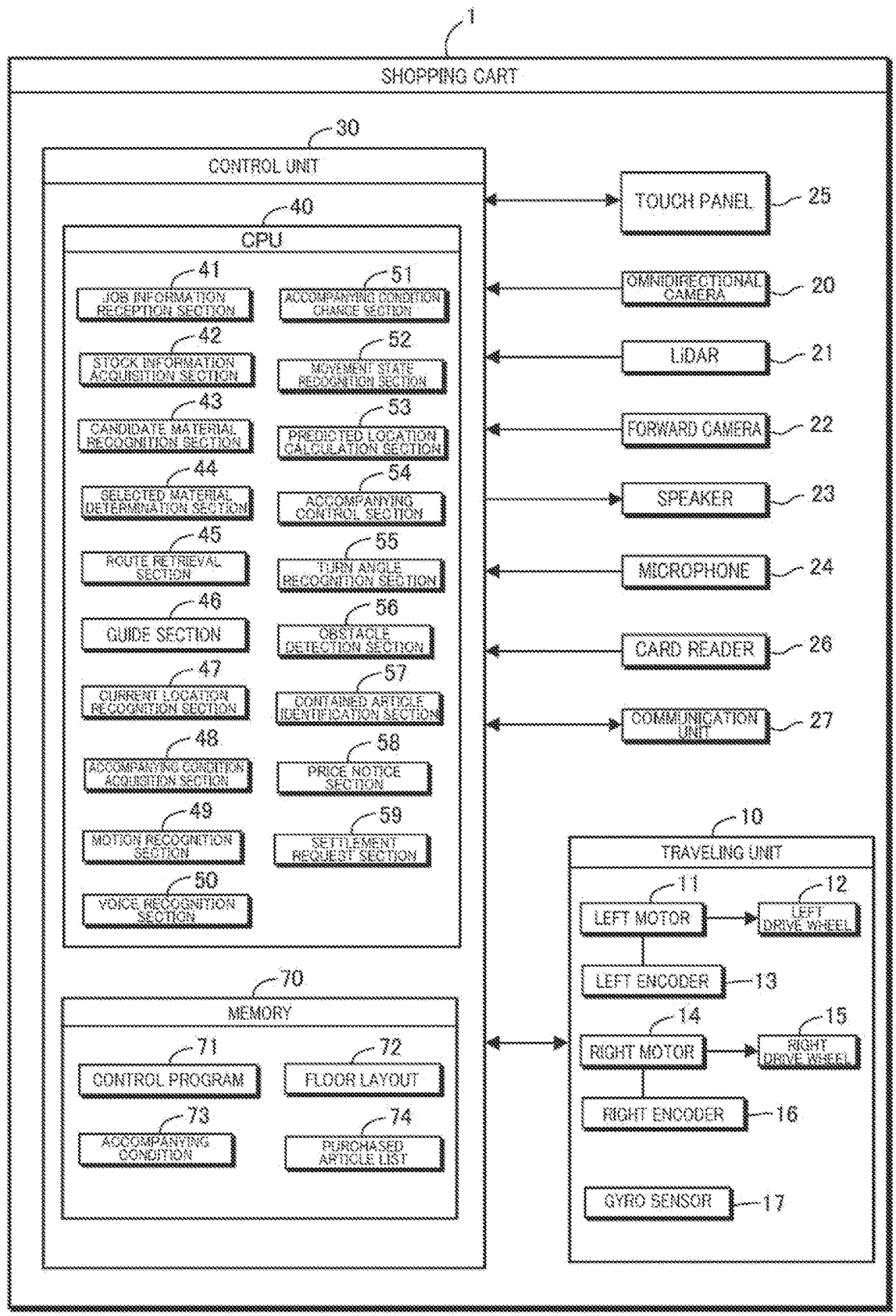
FIG. 2 is a configuration diagram of the shopping cart.

A configuration of the shopping cart 1 will be described with reference to FIGS. 2 to 4. Referring to FIG. 2, the control unit 30 is connected to the touch panel 25, the omnidirectional camera 20, the LiDAR 21, the forward camera 22, the speaker 23, the microphone 24, the card reader 26, the communication unit 27, and the traveling unit 10.

The traveling unit 10 includes a left motor 11 that drives the left drive wheel 12, a left encoder 13 that outputs one pulse signal each time the left motor 11 rotates by a first defined angle, a right motor 14 that drives the right drive wheel 15, a right encoder 16 that outputs one pulse signal each time the right motor 14 rotates by a second defined angle, and a gyro sensor 17 that detects an angular velocity of the shopping cart 1. The traveling unit 10 causes the shopping cart 1 to move in a straight line by making the left drive wheel 12 and the right drive wheel 15 have the same rotating speed, and causes the shopping cart 1 to turn round by making the left drive wheel 12 and the right drive wheel 15 have different rotating speeds or rotating directions.

The control unit 30 is an electronic circuit unit including a CPU (Central Processing Unit) 40, a memory 70, and the like. A control program 71 for the shopping cart 1, floor layout data 72 including information on a floor layout of the store 200, accompanying condition data 73 including information on an accompanying condition of the shopping cart 1, which will be described later, and purchased article list data 74 including information on a purchased article list, which will be described later, are stored in the memory 70.

The CPU 40 functions as a job information reception section 41, a stock information acquisition section 42, a candidate material recognition section 43, a selected material determination section 44, a route retrieval section 45, a guide section 46, a current location recognition section 47, and an accompanying condition acquisition section 48, by reading and executing the control program 71 stored in the memory 70. The CPU 40 further functions as a motion recognition section 49, a voice recognition section 50, an accompanying condition change section 51, a movement state recognition section 52, a predicted location calculation section 53, an accompanying control section 54, a turn angle recognition section 55, an obstacle detection section 56, a contained article identification section 57, a price notice section 58, and a settlement request section 59.

The job information reception section 41 receives a job that uses a product sold at the store 200, in response to an operation made by the user on the touch panel 25. In the present embodiment, since the store 200 is a store selling food, the job information reception section 41 receives a job of cooking a dish. For example, when the store 200 is a store dealing in DIY (do-it-yourself) materials such as a home center, the job information reception section 41 receives a job of making craftwork, repairing a house, or the like.

The stock information acquisition section 42 acquires information on the stocks of the ingredients at the home 300 of the user U from the smart home server 410 via the store management system 210. When the job of cooking a dish is received by the job information reception section 41, the candidate material recognition section 43 accesses the cooking recipe server 420 via the store management system 210 and acquires recipe information on the received dish. The candidate material recognition section 43 then extracts candidate materials required for the dish based on the recipe information.

Note that a configuration may be made such that the job information reception section 41 transmits information on a dish selected by the user U to the cooking recipe server 420 via the store management system 210, and the cooking recipe server 420 extracts candidate materials required for the dish and transmits candidate material information indicating the candidate materials to the shopping cart 1. In case of such a configuration, the candidate material recognition section 43 recognizes the candidate materials required for the dish from the candidate material information.

The selected material determination section 44 determines all or part of the candidate materials recognized by the candidate material recognition section 43 as selected materials to be purchased, in response to an operation made by the user on the touch panel 25. The route retrieval section 45 retrieves a route or routes that pass places where the selected materials are placed in the store 200 by referring to the floor layout data 72, and determines an optimal shopping route. Note that floor layout information may be acquired from the store management system 210 or the store group server 400. The guide section 46 displays the shopping route determined by the route retrieval section 45 on the touch panel 25 and guides the user U along the shopping route by causing the shopping cart 1 to move along the shopping route.

The current location recognition section 47 calculates an amount of movement of the shopping cart 1 from a reference location in the store 200 by counting pulse signals output from the left encoder 13 and pulse signals output from the right encoder 16. The reference location in the store 200 is set at, for example, a shopping cart station. The current location recognition section 47 recognizes a moving direction of the shopping cart 1 from a detection signal of the gyro sensor 17. The current location recognition section 47 detects a current location of the shopping cart 1 in the store 200, based on the amount of movement of the shopping cart 1 from the reference location and the moving direction of the shopping cart 1. Note that a detected value of the current location of the shopping cart 1 may be adjusted based on an image of an inside of the store 200 shot by the omnidirectional camera 20 or the forward camera 22.

A configuration may be made such that the shopping cart 1 receives signals transmitted from beacons deployed at a predetermined interval in the store, whereby the current location recognition section 47 recognizes the current location of the shopping cart 1. Alternatively, a configuration may be made such that the store management system 210 or the store group server 400 detects the current location of the shopping cart 1 from images shot by cameras deployed in the store and transmits current location information indicating the current location to the shopping cart 1, and the current location recognition section 47 recognizes the current location of the shopping cart 1 from the current location information.

The accompanying condition acquisition section 48 acquires an initial value of the accompanying condition used when the shopping cart 1 moves accompanying the user U, by referring to the accompanying condition data 73 stored in the memory 70. In the present embodiment, a direction of the shopping cart 1 (corresponding to a specified direction in the present invention, such as forward, backward, rightward, leftward, diagonally forward right, diagonally forward left, diagonally backward right, or diagonally backward left) relative to the user U, and a distance between the user U and the shopping cart 1 (corresponding to a specified distance in the present invention) are specified as accompanying conditions. Hereinafter, a direction set in the accompanying conditions will be referred to as the specified direction, and a distance set in the accompanying conditions will be referred to as the specified distance. Note that the initial values of the accompanying conditions may be acquired from the store management system 210 or the store group server 400.

The motion recognition section 49 recognizes a motion of the user U, based on an image of the user U shot by the omnidirectional camera 20. The voice recognition section 50 recognizes voice of the user U collected by the microphone 24. When a gesture instructing a change in the accompanying conditions, or a change in a line of sight of the user U, is recognized by the motion recognition section 49, or when voice instructing a change in the accompanying conditions is recognized by the voice recognition section 50, the accompanying condition change section 51 changes the accompanying conditions (one or both of the specified direction and the specified distance) in accordance with a result of the recognition.

The movement state recognition section 52 recognizes a state of movement of the user U, based on an image of the user U shot by the omnidirectional camera 20 and a location of the user U detected by the LiDAR 21. The predicted location calculation section 53 calculates a predicted location of the user U after a first predetermined time period, based on the state of movement of the user U recognized by the movement state recognition section 52. The accompanying control section 54 performs accompanying control to cause the shopping cart 1 to accompany the user U, by causing the shopping cart 1 to travel to a target location of accompanying, which is a location apart from the predicted location of the user U calculated by the predicted location calculation section 53 by the specified distance in the specified direction that are set in the accompanying conditions.

By setting the target location of accompanying according to the state of movement of the user U and causing the shopping cart 1 to travel as described above, the ability of the shopping cart 1 to follow the movement of the user U can be enhanced.

The turn angle recognition section 55 recognizes an angle of a turn made by the user U, based on the state of movement of the user U recognized by the movement state recognition section 52. The obstacle detection section 56 detects an obstacle existing in the traveling direction of the shopping cart 1, based on an image shot by the forward camera 22 and a location of an object detected by the LiDAR 21.

The contained article identification section 57 recognizes that an article (a product in the present embodiment) is contained in the basket 5, based on an image shot by the omnidirectional camera 20. Moreover, the contained article identification section 57 identifies the product by analyzing the image of the product contained in the basket 5, or reading an identification code such as a bar code attached to the product from the image. The price notice section 58 inquires about a price of the product by transmitting information (a name, the identification code, or the like) on the product identified by the contained article identification section 57 to the store management system 210. In response to the inquiry, the store management system 210 acquires the price of the product by referring to the product DB 211 and transmits price information indicating the price of the product to the control unit 30. The price notice section 58 recognizes the price of the product from the price information and displays the price of the product on the touch panel 25.

When the user U makes an instruction to pay by card, for example, by touching a "settlement button" (not shown) displayed on the touch panel 25, the settlement request section 59 reads the credit card number on the membership card owned by the user U through the card reader 26. The settlement request section 59 then requests card settlement by transmitting settlement request information including the credit card number and a sum of the prices of products recognized by the price notice section 58 to the card company server 430. Note that a configuration may be made such that a cash insertion slot is provided on the shopping cart 1 to make cash payment possible.

Figure 3:
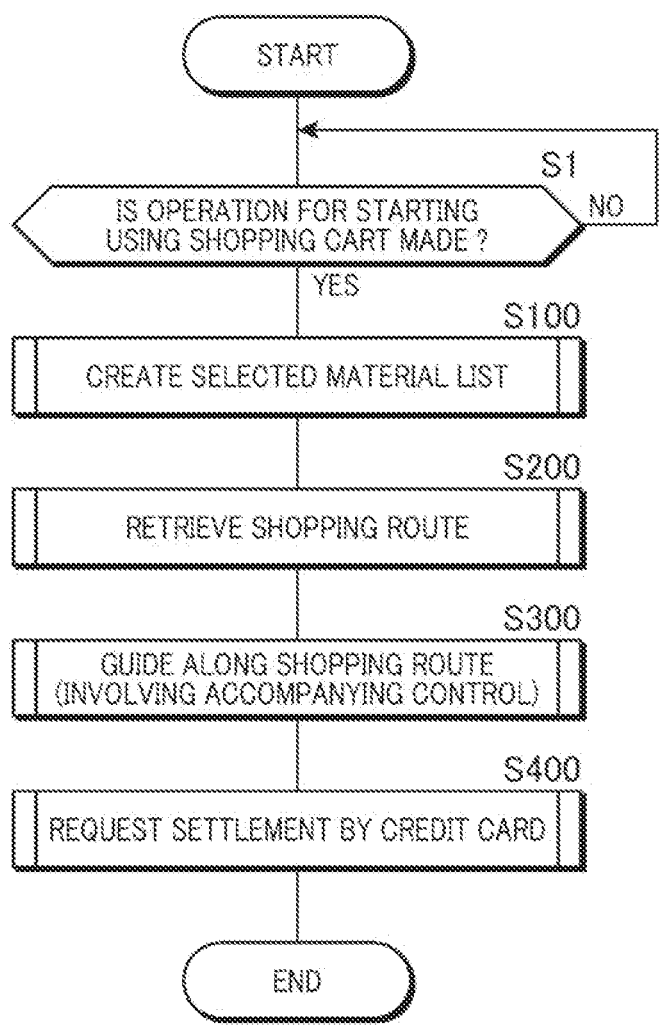
FIG. 3 is a flowchart of operations of the shopping cart.

The control unit 30 assists the user U in shopping at the store 200 by executing a series of processing according to a flowchart shown in FIG. 3. When an operation for starting using the shopping cart 1 made by the user U is recognized in step S1 in FIG. 3, the job information reception section 41 of the control unit 30 displays an initial guide screen 100 as shown in FIG. 4 on the touch panel 25. Referring to FIG. 4, a floor layout 101 that presents a sales floor layout of the store 200 and an ON/OFF button 102 that gives instructions to start and to finish using the shopping cart 1 are displayed in the initial guide screen 100.

Moreover, a dish selection button 103 for giving an instruction to use an ingredient search menu according to a dish, a purchased article list button 104 for giving an instruction to display the purchased article list that presents products put in the basket 5 by the user U in a list form, and a special sales information button 105 for giving an instruction to display special sales information are displayed in the initial guide screen 100.

The job information reception section 41 recognizes an image part of the user U located behind the shopping cart 1 from an image shot by the omnidirectional camera 20. The job information reception section 41 then extracts information that can identify the user U (information indicating a characteristic such as a face, a body shape, or clothes of the user U) from the image part of the user U, and stores the information that can identify the user U in the memory 70. The motion recognition section 49 and the movement state recognition section 52 identifies and extracts an image part of the user U from an image shot by the omnidirectional camera 20 by using the information that can identify the user U stored in the memory 70, and recognizes a motion or a state of movement of the user U.

When an operation of touching the dish selection button 103 is detected, the control unit 30 advances the processing to step S100 and executes processing of "creating a selected material list". Through the processing of "creating a selected material list", the control unit 30 creates a selected material list (see FIG. 7, which will be described later) in which materials to be purchased this time, among materials to be used for the dish, are listed. In subsequent step S200, the control unit 30 executes processing of "retrieving a shopping route". Through the processing of "retrieving a shopping route", the control unit 30 retrieves a shopping route (see FIG. 11, which will be described later) that is a route to each of display places of the selected materials listed in the selected material list.

In subsequent step S300, the control unit 30 executes processing of "guiding along the shopping route". Through the processing of "guiding along the shopping route", the control unit 30 causes the shopping cart 1 to guide the user U to each of the display places of the selected materials by causing the shopping cart 1 to travel along the shopping route, while causing the shopping cart 1 to accompany the user U and move through the accompanying control. In subsequent step S400, the control unit 30 executes processing of "requesting settlement by credit card". Through the processing of "requesting settlement by credit card", the control unit 30 requests card settlement to pay for the products contained in the basket 5 of the shopping cart 1, in response to an instruction made by the user U through an operation for card settlement.

Hereinafter, details of each processing of "creating a selected material list", "retrieving a shopping route", "guiding along the shopping route", and "requesting settlement by credit card" will be described.

3. Creating Selected Material List

Figure 5:
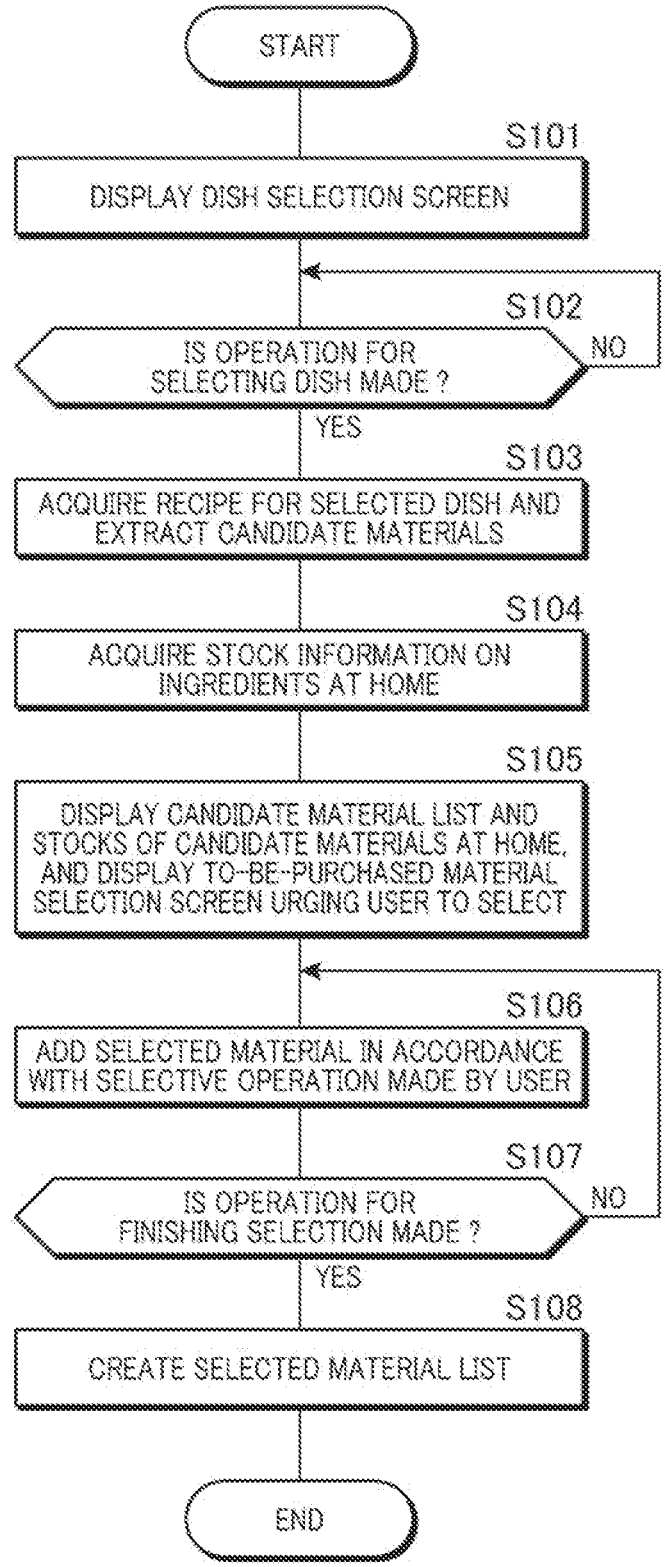
FIG. 5 is a flowchart of processing of creating a selected material list.

The processing of "creating a selected material list" will be described, following a flowchart shown in FIG. 5. In step S101 in FIG. 5, the job information reception section 41 displays a dish selection screen on the touch panel 25. When an operation for selecting a job of cooking a dish is made by the user U, the job information reception section 41 advances the processing to step S103. Hereinafter, a description will be given of a case where the user U selects a dish of pork curry.

In step S103, the candidate material recognition section 43 accesses the cooking recipe server 420 via the store management system 210 and acquires a recipe for pork curry. The candidate material recognition section 43 then extracts candidate materials required for the dish of pork curry by referring to the acquired recipe. In subsequent step S104, the stock information acquisition section 42 accesses the smart home server 410 via the store management system 210. The stock information acquisition section 42 then acquires the ingredient stock data Stk_dat on the home 300 of the user U recorded in the stock DB 411.

Subsequent steps S105 to S107 are processing by the selected material determination section 44. In step S105, the selected material determination section 44 displays a to-be-purchased material selection screen 110 as shown in FIG. 6 on the touch panel 25, based on the candidate materials extracted by the candidate material recognition section 43 and the ingredient stock data Stk_dat.

As shown in FIG. 6, a dish name 111, a candidate material list 112, and a selection determination button 113 are displayed in the to-be-purchased material selection screen 110. In the candidate material list 112, a candidate material name 112a, a required amount 112b of each candidate material, a home stock 112c of each candidate material, and a selection check field 112d for each candidate material are displayed. By having a look at the to-be-purchased material selection screen 110, the user U can select a material to be purchased this time among the candidate materials, while taking the home stock into consideration. The user U specifies a selected material that is a material to be purchased, by making an operation of touching the selection check field 112d for a candidate material the user U wants to purchase.

Figure 7:
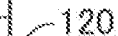
FIG. 7 is an illustrative diagram of a selected material list.

Through a loop of subsequent steps S106 and S107, the selected material determination section 44 adds a selected material in response to a selective operation made by the user U in step S106 until an operation of touching the selection determination button 113 is made in step S107. When an operation of touching the selection determination button 113 is made in step S107, the selected material determination section 44 advances the processing to step S108 and creates a selected material list 120 as shown in FIG. 7.

4. Retrieving Shopping Route

Figure 8:
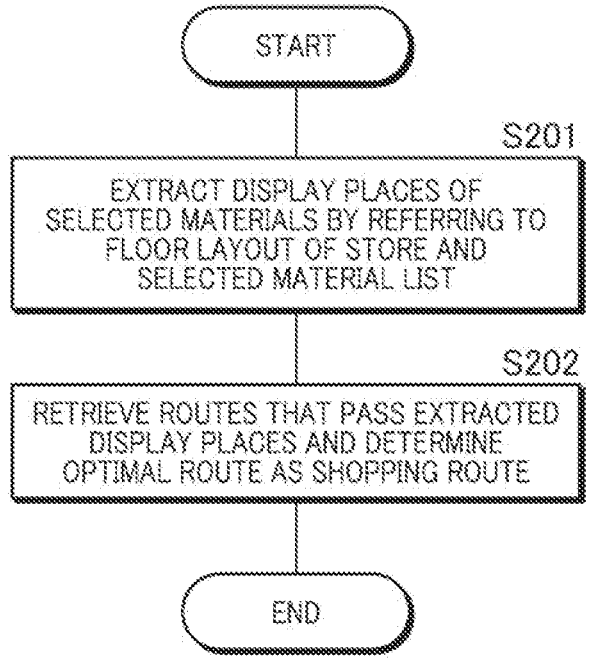
FIG. 8 is a flowchart of processing of retrieving a shopping route.

The processing of "retrieving a shopping route" will be described, following a flowchart shown in FIG. 8. In step S201 in FIG. 8, the route retrieval section 45 refers to the floor layout of the store 200 recorded in the floor layout data 72 and extracts display locations (locations) of the selected materials listed in the selected material list 120. As shown in FIG. 9, the display locations of the selected materials are specified by two-dimensional coordinates on a floor of the store 200. In the example shown in FIG. 9, for example, the display location of pork is (xa, ya).

In subsequent step S202, the route retrieval section 45 retrieves a route or routes that pass the display locations of the selected materials, with the current location of the shopping cart 1 detected by the current location recognition section 47 as a starting point. The route retrieval section 45 then determines a route with a shortest travel distance as a shopping route. Note that the shopping route may be determined by taking types of the selected materials into consideration. For example, when the selected materials include a first ingredient that does not require refrigerating or freezing and a second ingredient that requires refrigerating or freezing, the shopping route may be determined such as to arrive at a location of the first ingredient first and then arrive at a location of the second ingredient.

5. Guiding Along Shopping Route

Figure 10:
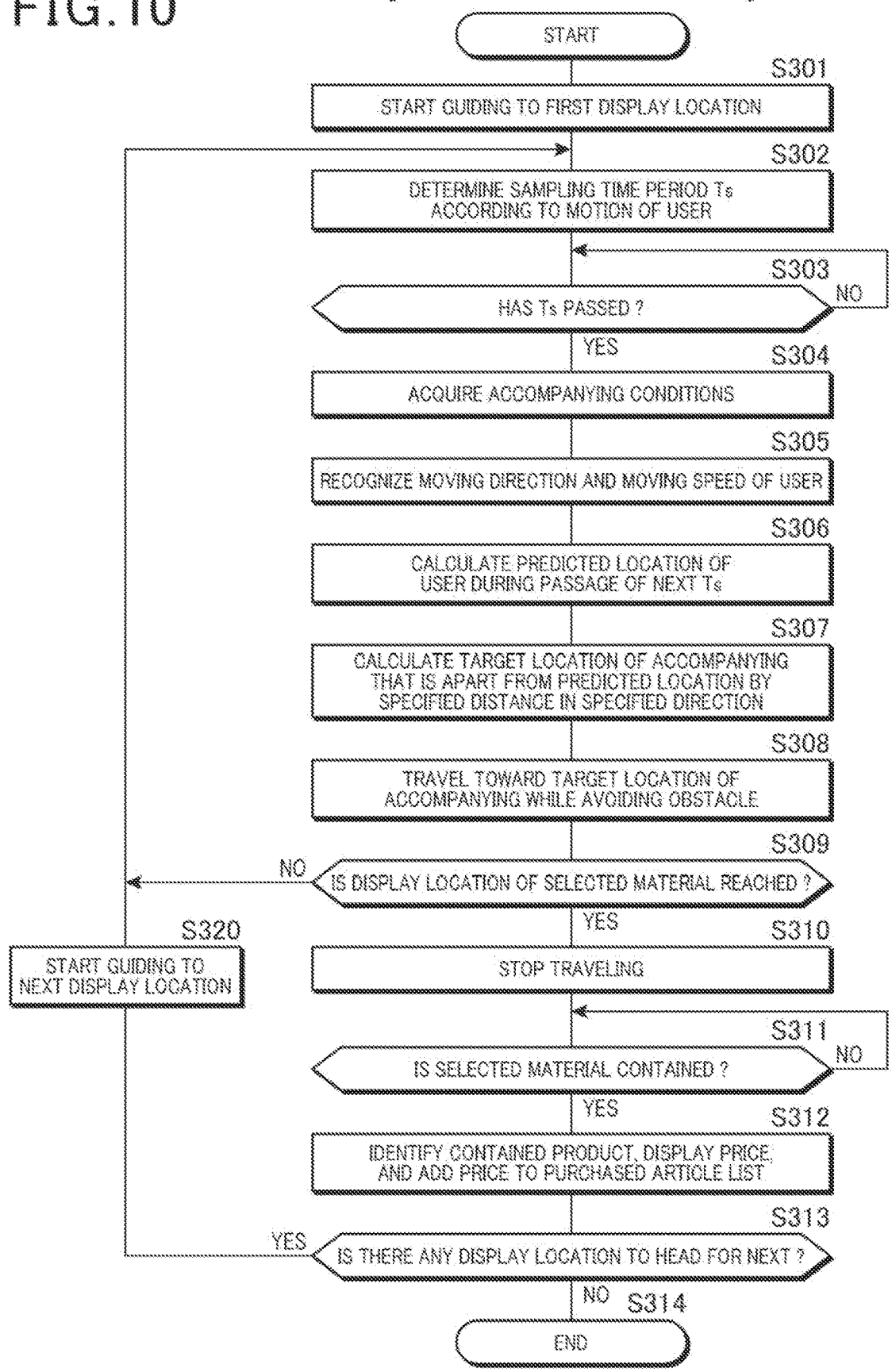
FIG. 10 is a flowchart of processing of guiding along the shopping route.
Figure 11:
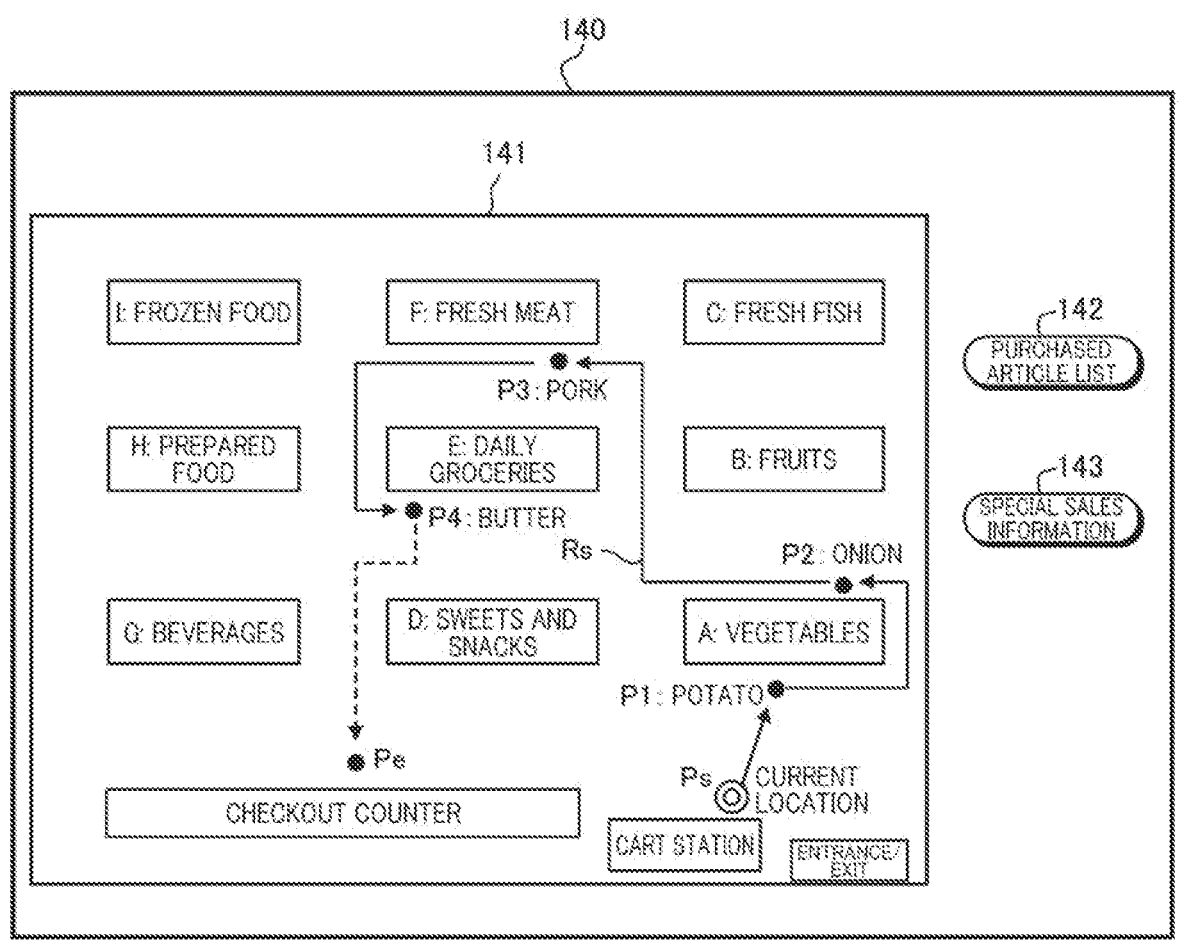
FIG. 11 is an illustrative diagram of a guide screen for a route of purchase.

The processing of "guiding along the shopping route" will be described, following a flowchart shown in FIG. 10. In step S301 in FIG. 10, the guide section 46 displays a shopping route guide screen 140 as shown in FIG. 11 on the touch panel 25 and starts guiding along the shopping route. A floor layout 141 of the store 200 is displayed in the shopping route guide screen 140, and the shopping route Rs is presented on the floor layout 141.

The shopping route Rs is a route that passes the cart station that is the current location Ps of the shopping cart 1, P1 that is the display location of potatoes in a vegetables corner A, P2 that is the display location of onions in the vegetables corner A, P3 that is the display location of pork in a fresh meat corner F, and P4 that is the display location of butter in a daily groceries corner E, in the above-mentioned order.

The guide section 46 presents the shopping route Rs on the floor layout 141 and guides the user U along the shopping route by controlling operations of the left motor 11 and the right motor 14 of the traveling unit 10 to cause the shopping cart 1 to travel along the shopping route. Note that after guiding along the shopping route is finished, the guide section 46 may guide the user U along a route to a checkout counter when the user U pays at the checkout counter, or may guide the user U along a route to an entrance/exit when the user U has completed payment through card settlement, which will be described later.

In the shopping route guide screen 140, a purchased article list button 142 and a special sales information button 143 are displayed in addition to the floor layout 141. When the purchased article list button 142 is operated, the price notice section 58 displays a purchased article list screen 160 as shown in FIG. 13 on the touch panel 25. When the special sales information button 143 is operated, the guide section 46 displays information on bargain-priced articles offered at the store 200 on the touch panel 25.

When the user U selects a bargain-priced article in the screen displaying the information on the bargain-priced articles, the selected material determination section 44 adds the selected bargain-priced article to the selected material list 120. The route retrieval section 45 then re-retrieves a route or routes and determines a shopping route that passes a display place of the selected bargain-priced article.

A loop of subsequent steps S302 to S309 is processing for performing the accompanying control to cause the shopping cart 1 to accompany the user U when the shopping cart 1 is caused to travel along the shopping route and guide the user U along the shopping route. In step S302, the accompanying control section 54 determines a sampling cycle Ts used when the shopping cart 1 is caused to move in response to a motion of the user U recognized by the motion recognition section 49 through the looped processing in steps S302 to S309. The sampling cycle Ts corresponds to a time interval at which the predicted location of the user is calculated in the present invention.

Since processing in and after step S304 is performed after a wait for passage of Ts in subsequent step S303, the accompanying control section 54 can change an interval at which the looped processing in steps S302 to S309 is performed, by changing Ts.

More specifically, when any of motions (1) to (3) described below is recognized by the motion recognition section 49, the accompanying control section 54 makes the sampling cycle Ts shorter than an initial value.

(1) The user U changes the traveling direction by an angle not smaller than a first predetermined angle.
(2) The user U changes the direction of the head or body by an angle not smaller than a second predetermined angle.
(3) The user U changes the direction of the line of sight by an angle not smaller than a third predetermined angle.

The first to third predetermined angles are set at, for example, 90 degrees. The first to third predetermined angles may be set at the same angle, or may be set at different angles.

When any of the above-described motions (1) to (3) is recognized, it is highly possible that the traveling direction of the user U has been abruptly changed, or that the traveling direction of the user U will be abruptly changed. Accordingly, the accompanying control section 54 makes the sampling cycle Ts shorter than the initial value, whereby responsiveness of the shopping cart 1 to an abrupt change in the traveling direction of the user U is enhanced, and thus the shopping cart 1 is prevented from making delay in accompanying.

In subsequent step S304, the accompanying control section 54 acquires the initial values of the accompanying conditions recorded in the accompanying condition data 73. For the initial values of the accompanying conditions, for example, the specified direction is set at a forward direction, and the specified distance is set at 30 cm. The user U can change the accompanying conditions as needed, which will be described later.

In subsequent step S305, the movement state recognition section 52 recognizes a moving direction and a moving speed of the user U, based on an image of the user U shot by the omnidirectional camera 20 and a location of the user U detected by the LiDAR 21. In step S306, the predicted location calculation section 53 calculates a predicted location of the user U during passage of next Ts, based on the moving direction and the moving speed of the user U recognized by the movement state recognition section 52.

Figure 12:
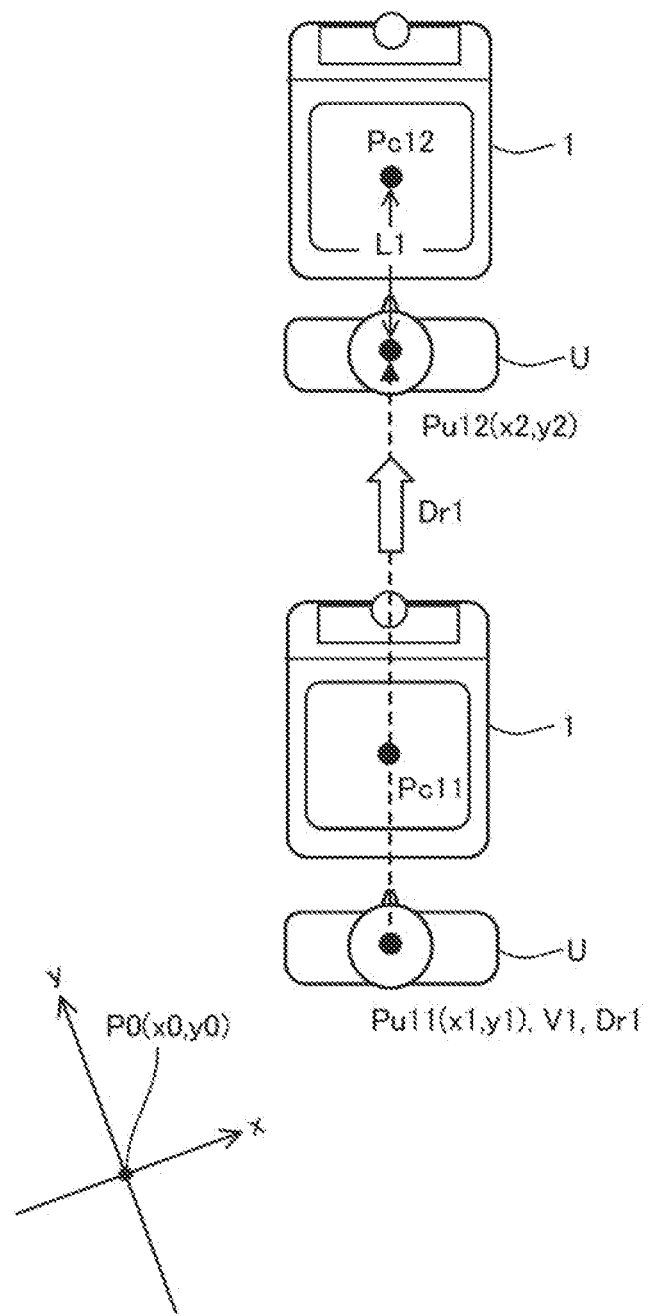
FIG. 12 is an illustrative diagram of a form of the shopping cart that accompanies in front of the user in a situation where the user moves in a straight line.

In subsequent step S307, the accompanying control section 54 calculates a target location of accompanying that is apart from the predicted location of the user U calculated by the predicted location calculation section 53 by the specified distance in the specified direction. Here, FIG. 12 shows an example where the target location of accompanying is calculated in a situation where the user U moves in a straight line. In FIG. 12, the current location of the user U is represented by Pu1(x1, y1), the current location of the shopping cart 1 is represented by Pc11, and the predicted location of the user U after Ts is represented by Pu12(x2, y2).

When the moving direction and the moving speed of the user U recognized at Pu11(x1, y1) by the movement state recognition section 52 are Dr1 and V1, respectively, the predicted location calculation section 53 calculates the predicted location Pu12(x2, y2) by using the following equations (1) and (2):

$$x2=x1+V1\_x \times Ts \quad (1)$$

$$y2=y1+V1\_y \times Ts \quad (2)$$

where V1_x is an x component of the speed V1 in the direction Dr1, and V1_y is a y component of the speed V1 in the direction Dr1.

The accompanying control section 54 calculates, as the target location of accompanying, a location Pc12 that is apart from the predicted location Pu12(x2, y2) by the specified distance L1 in the specified direction (here, the forward direction of the user U). In step S308, the accompanying control section 54 causes the shopping cart 1 to travel in such a manner that the shopping cart 1 arrives at the target location of accompanying when Ts passes.

While the accompanying control section 54 causes the shopping cart 1 to travel, the obstacle detection section 56 detects an obstacle existing in front of the shopping cart 1, based on an image shot by the forward camera 22 and a location of an object detected by the LiDAR 21. When an obstacle is detected by the obstacle detection section 56, the accompanying control section 54 performs processing for avoiding contact with the obstacle. For the processing for avoiding contact with the obstacle, processing of changing the traveling direction of the shopping cart 1 such as to avoid the obstacle, processing of causing the shopping cart 1 to stop, giving the user notice of the existence of the obstacle, and urging the user to change the traveling direction, or the like can be performed.

Here, when the user U deviates from the shopping route by a predetermined distance or longer, the guide section 46 displays a screen urging the user U to return to the shopping route on the touch panel 25, or gives notice by outputting an audio guidance urging the user U to return to the shopping route from the speaker 23. The guide section 46 may be configured to re-retrieve a shopping route.

In subsequent step S309, the guide section 46 determines whether or not the shopping cart 1 has arrived at the display place of a selected material, based on the current location of the shopping cart 1 detected by the current location recognition section 47. When the shopping cart 1 has arrived at the display place of a selected material, the guide section 46 advances the processing to step S310 and causes the shopping cart 1 to stop traveling. When the shopping cart 1 has not arrived at the display place of a selected material, the guide section 46 advances the processing to step S302.

In step S311, when the contained article identification section 57 recognizes that the selected material is contained in the basket 5 based on an image shot by the omnidirectional camera 20, the processing is advanced to step S312. Note that when the guide section 46 determines in step S309 that the shopping cart 1 has arrived at the display place of a selected material, or when the contained article identification section 57 recognizes in step S311 that the selected material is contained in the basket 5, a display of the selected material shelved at the reached display place or the selected material contained in the basket 5 may be ceased in the shopping route guide screen 140.

In step S312, the price notice section 58 acquires a price of each product additionally contained in the basket 5 by communicating with the store management system 210 and displays the price on the touch panel 25. The price notice section 58 adds the price of each product additionally contained in the basket 5 to a purchased article list 162 as shown in FIG. 13 and updates the purchased article list data 74 (see FIG. 2) stored in the memory 70.

Figure 4:
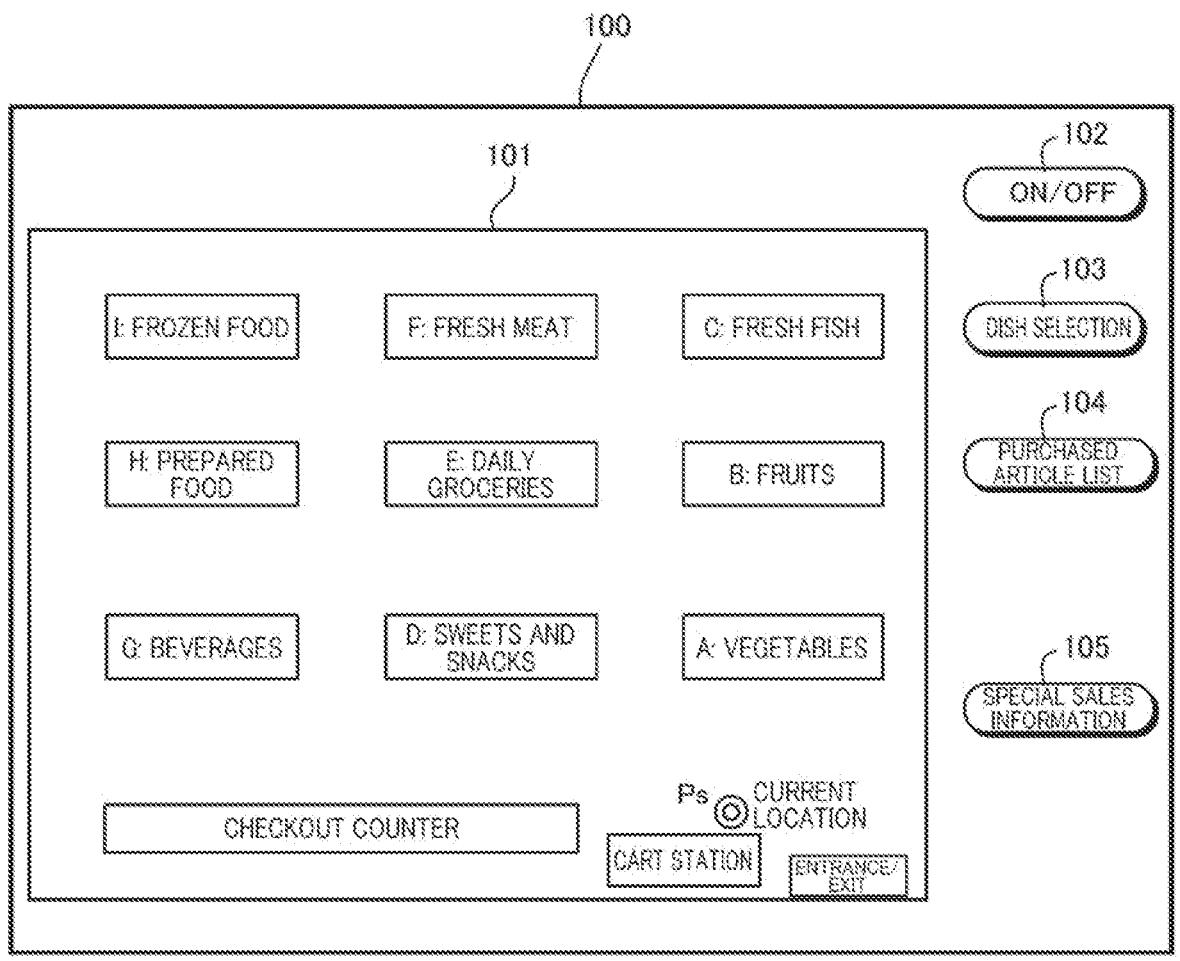
FIG. 4 is an illustrative diagram of an initial guide screen.

FIG. 13 shows the purchased article list screen 160, which is displayed on the touch panel 25 in response to an operation of the purchased article list button 104 (see FIG. 4). In the purchased article list screen 160, a dish name and servings 161 and a card settlement button 163 for instructing card settlement are displayed in addition to the purchased article list 162. When the contained article identification section 57 recognizes that a product other than the materials listed in the selected material list 120 is contained in the basket 5, the price notice section 58 also acquires a price of the product, adds the price of the product to the purchased article list 162, and updates the purchased article list data 74.

In subsequent step S313, the guide section 46 determines whether or not there is any display place to head for next. When there is no display place to head for next, the guide section 46 advances the processing to step S314 and terminates the processing of "guiding along the shopping route". When there is a display place to head for next, the guide section 46 advances the processing to step S320, starts guiding to the next display place, and advances the processing to step S302. Thus, the shopping cart 1 that is waiting in a stopped state resumes traveling.

6. Accompanying Control Performed when User Abruptly Turns

Figure 14:
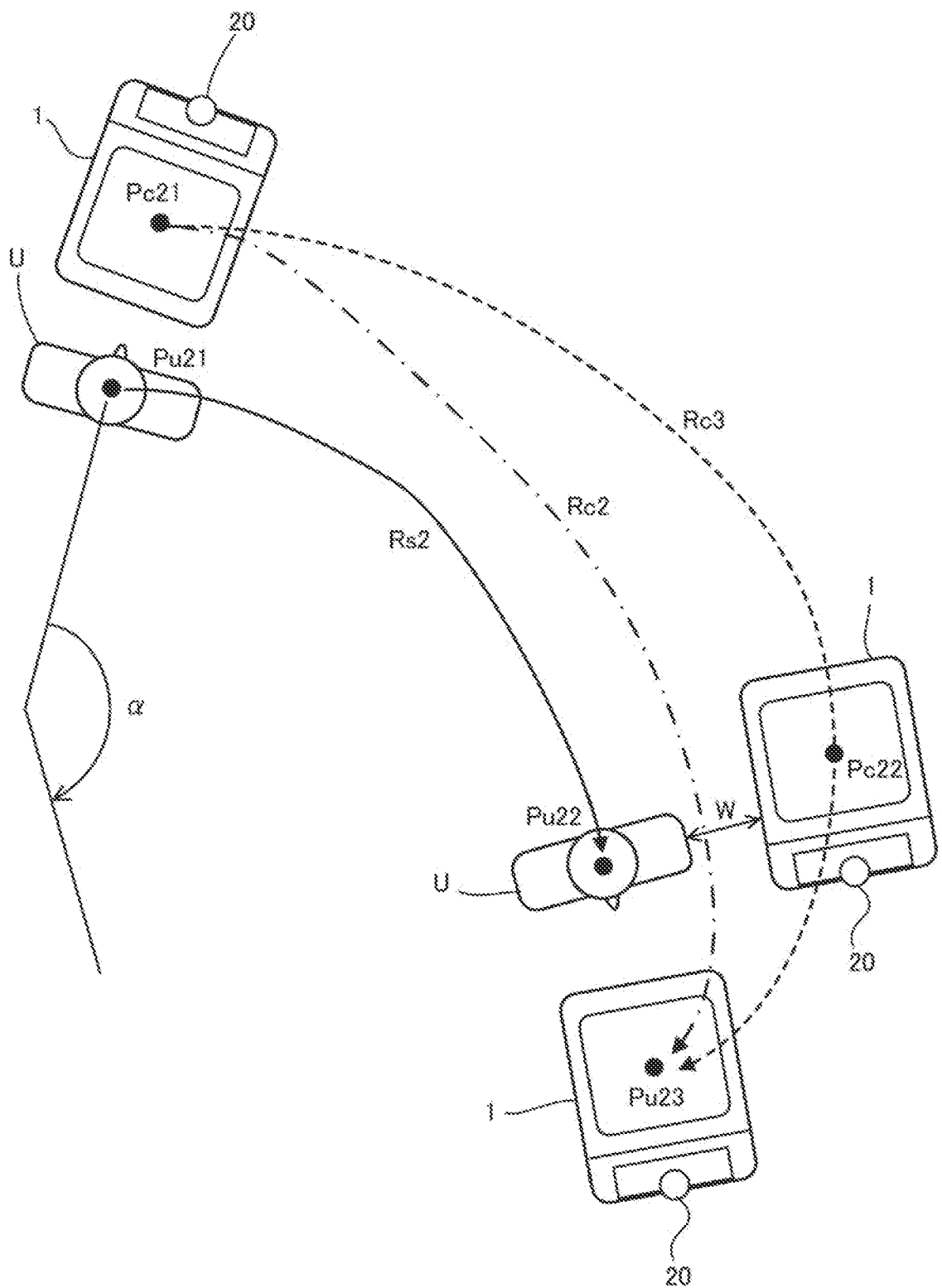
FIG. 14 is an illustrative diagram of a form of the shopping cart that overtakes the user in a situation where the user abruptly turns.
Figure 15:
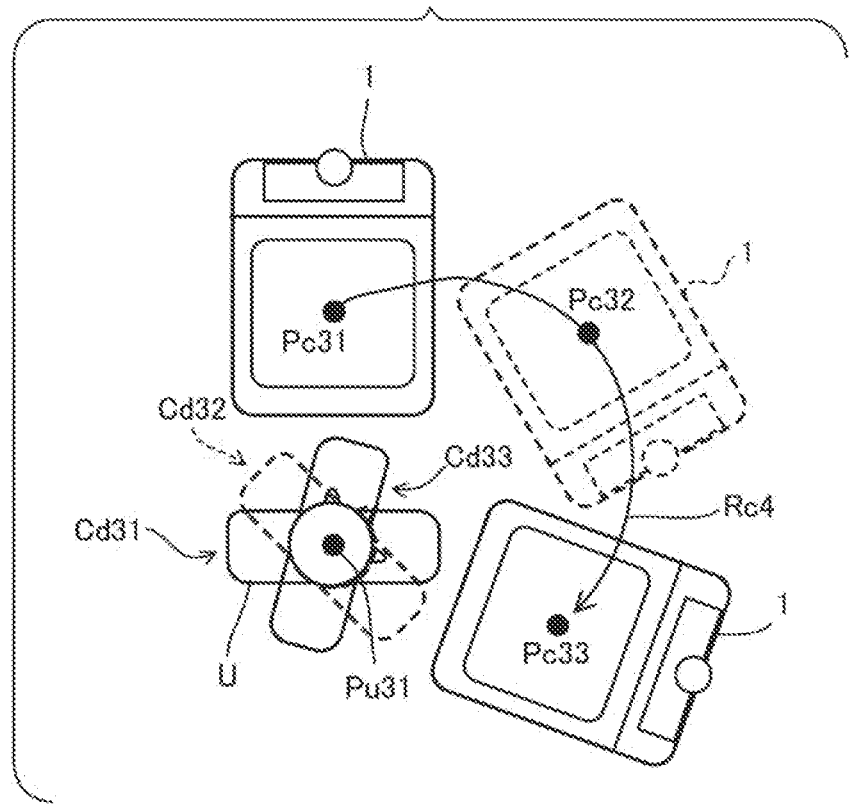
FIG. 15 is an illustrative diagram of a form of shopping cart that moves around the user when the user turns round at one place.

A description will be given of control performed when the user U abruptly turns while the accompanying control section 54 performs the accompanying control, with reference to FIGS. 14 and 15. FIG. 14 shows an example where the user U makes a turn while moving, and FIG. 15 shows an example where the user U turns round at one place without moving.

FIG. 14 shows a case where the user U moves from a current location Pu21 to Pu22 along a route Ru2 while making a turn in a situation where the accompanying control to cause the shopping cart 1 to accompany in front of the user U is performed. In such a case, if the shopping cart 1 is caused to travel along a shortest route Rc2 to come around in front of the user U, the shopping cart 1 is likely to make contact with the user U when shopping cart 1 overtakes the user U.

Accordingly, the turn angle recognition section 55 recognizes a turn angle α of the user U, based on the state of movement of the user U recognized by the movement state recognition section 52. When the turn angle α of the user U is not smaller than a fourth predetermined angle (for example, 90 degrees), the accompanying control section 54 causes the shopping cart 1 to come around to a location Pc23 in front of the user U by using a route Rc3 that keeps the distance between the user U and the shopping cart 1 not shorter than a predetermined distance W. Note that the predetermined distance W may be set depending on the turn angle α, for example, in such a manner that the predetermined distance W is lengthened as the turn angle α is larger.

Moreover, the accompanying control section 54 performs control to gradually increase the traveling speed of the shopping cart 1 after a state of the shopping cart 1 moving in parallel with the user U near a location Pc22 where the shopping cart 1 overtakes the user U is maintained for a second predetermined time period. Thus, it is made easier for the user U to recognize that the shopping cart 1 is approaching. The shopping cart 1 may be caused to swiftly move and come in front of the user U by setting the moving speed of the shopping cart 1 to increase as the turn angle α of the user U is larger.

When the shopping cart 1 is configured to change a shooting direction not with the omnidirectional camera 20 but by rotating an attachment portion of a camera that shoots a predetermined range, the camera may be turned toward the user U to assuredly check a location of the user U while the shopping cart 1 overtakes the user U.

Next, FIG. 15 shows a case where the user U turns round at one place and changes position in order of Cd31, Cd32, and Cd33. In such a case, the turn angle α of the user U recognized by the turn angle recognition section 55 is also not smaller than the fourth predetermined angle. Accordingly, the accompanying control section 54 causes the shopping cart 1 to travel along a route Rc4 that keeps the distance between the user U and the shopping cart 1 not shorter than the predetermined distance W, as described above. FIG. 15 shows an example where the accompanying control section 54 sets the route Rc4 to be an arc of a circle centering around a location Pu31 of the user U.

Note that when the user U turns round at one place, the shopping cart 1 may be caused to start traveling at a timing when a predetermined time period passes, without causing the shopping cart 1 to immediately start traveling. Thus, the shopping cart 1 can be restrained from frequently moving around the user U in response to a minor turning action of the user U.

7. Changing Accompanying Conditions

The processing of "changing the accompanying conditions" will be described, following a flowchart shown in FIG. 16. The accompanying condition change section 51 changes the specified direction and the specified distance that are the accompanying conditions in response to an instruction from the user U while the accompanying control is performed by the accompanying control section 54, by performing the processing according to the flowchart shown in FIG. 16.

Figure 16:
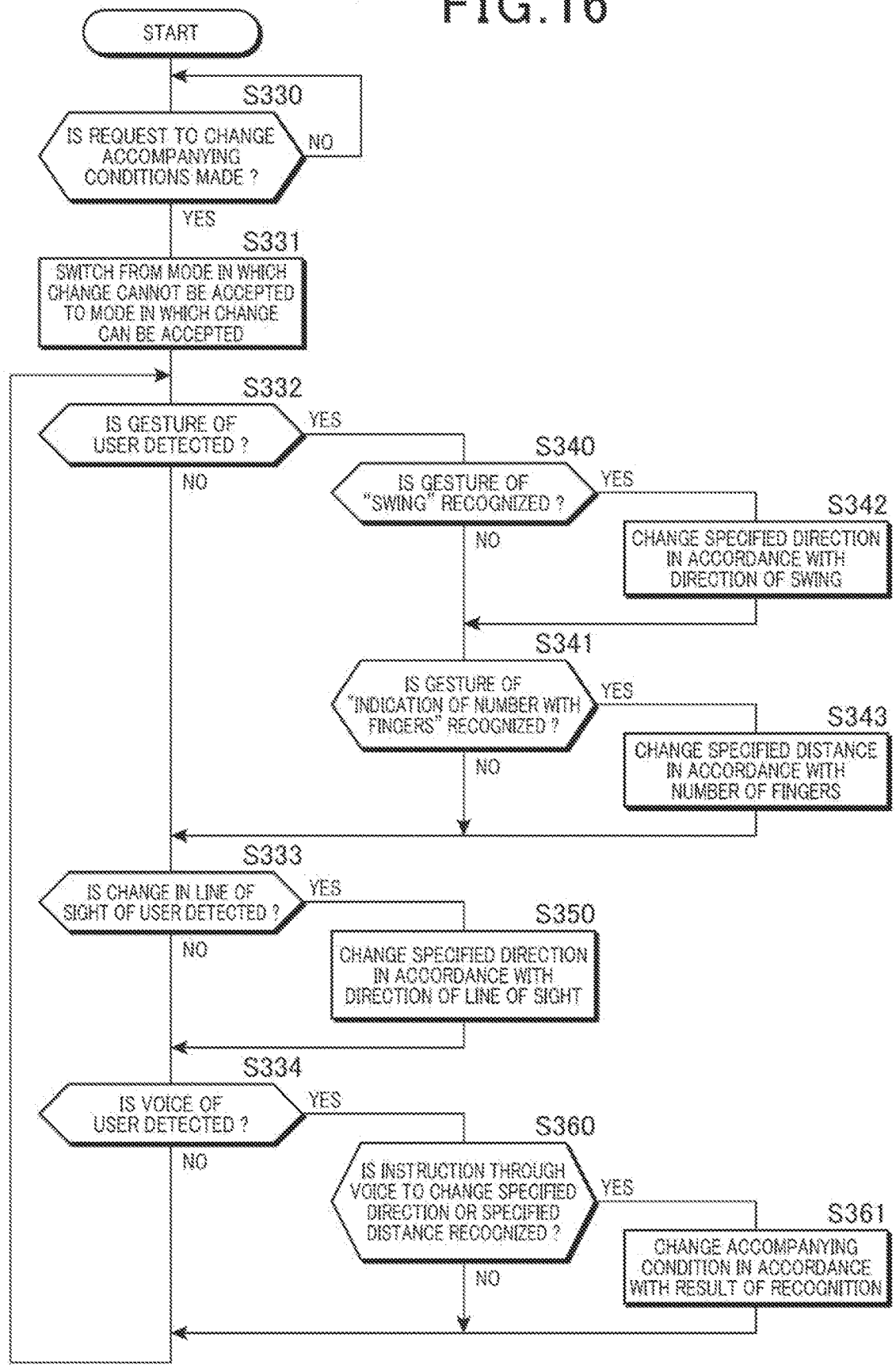
FIG. 16 is a flowchart of processing of changing accompanying conditions.

In step S330 in FIG. 16, the accompanying condition change section 51 determines whether or not a request to change the accompanying conditions is made by the user U. When any of change request conditions 1 to 3 described below is met, the accompanying condition change section 51 determines that a request to change the accompanying conditions is made, and advances the processing to step S331.

Change request condition 1: the motion recognition section 49 recognizes a gesture of the user U such as waving a palm, from an image shot by the omnidirectional camera 20.

Change request condition 2: the voice recognition section 50 recognizes voice produced by the user U such as "want to change the accompanying conditions", from an audio signal collected by the microphone 24.

Change request condition 3: the motion recognition section 49 recognizes that the user U directs the line of sight toward the omnidirectional camera 20 for a predetermined time period or longer, from an image shot by the omnidirectional camera 20.

Here, when the accompanying condition change section 51 determines that a request to change the accompanying conditions is made, notice of a way of moving the shopping cart 1 thereafter (for example, a way of giving instructions on operations through gestures) may be given through a display on the touch panel 25 or an output of an audio guidance from the speaker 23.

In step S331, the accompanying condition change section 51 switches from an accompanying condition change prohibition mode in which acceptance of an instruction to change the accompanying conditions from the user U is prohibited, to an accompanying condition change permission mode in which acceptance of an instruction to change the accompanying conditions from the user U is permitted. By performing the processing of switching modes as described above, the accompanying condition change section 51 can be prevented from erroneously recognizing a motion instinctively made by the user U as an instruction to change the accompanying conditions.

In looped processing in subsequent steps S332 to S334, in step S332, the motion recognition section 49 repeatedly detects presence or absence of a gesture of the user U, based on an image of the user U shot by the omnidirectional camera 20. In step S333, the motion recognition section 49 repeatedly detects a change in the direction of the line of sight of the user U, based on an image of the user U shot by the omnidirectional camera 20. In step S334, the voice recognition section 50 repeatedly detects voice of the user U.

When the motion recognition section 49 detects a gesture of the user U in step S332, the motion recognition section 49 advances the processing to step S340 and determines whether or not the gesture is a "swing of an arm". The motion recognition section 49 advances the processing to step S342 when the gesture is a "swing of an arm", but advances the processing to step S341 when the gesture is not a "swing of an arm". In step S342, the accompanying condition change section 51 changes the specified direction in accordance with a direction of the swing and advances the processing to step S341.

Figure 17:
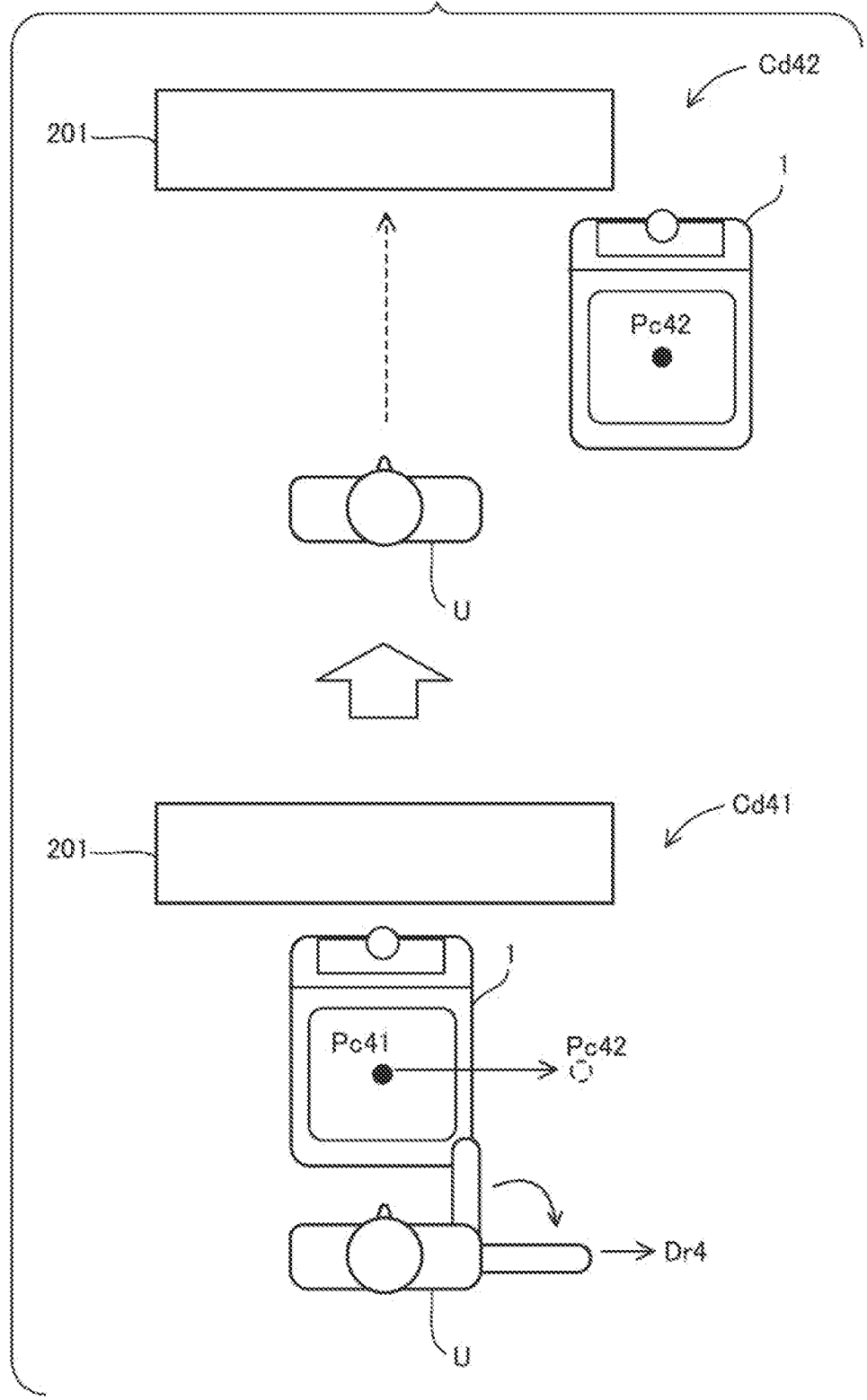
FIG. 17 is an illustrative diagram of a form of changing a specified direction of the accompanying conditions through a gesture of swinging an arm.

Here, FIG. 17 shows an example where the specified direction of the accompanying conditions is changed by a gesture of the user U that is the "swing of an arm". In FIG. 17, Cd41 shows a situation where the specified direction is a forward direction, and the user U moves the shopping cart 1 to a right side in order to purchase a product shelved on a display shelf 201 in front of the user U while the shopping cart 1 accompanies in front of the user U. In Cd41, the user U instructs the shopping cart 1 to move in a rightward direction by swinging the right arm from the front toward the right side in a direction Dr4.

In such a case, the accompanying condition change section 51 changes the specified direction of the accompanying conditions from the forward direction to a rightward direction. The accompanying control section 54 then executes a change-responsive movement to cause the shopping cart 1 to travel from a current location Pc41 toward a location Pc42 in the direction Dr4. Thus, as shown in Cd42, the shopping cart 1 moves to the right side of the user U, and the user U can approach the display shelf 201 and pick up the product. Thereafter, when the user U moves and the distance between the user U and the shopping cart 1 becomes equal to or longer than the specified distance, the accompanying control is resumed.

In step S341, the motion recognition section 49 determines whether or not the gesture of the user U is an "indication of a number with fingers". The motion recognition section 49 advances the processing to step S343 when the gesture is an "indication of a number with fingers", and advances the processing to step S333 when the gesture is not an "indication of a number with fingers". In step S343, the accompanying condition change section 51 changes the specified distance of the accompanying conditions in accordance with the number of fingers indicated by the gesture.

Figure 18:
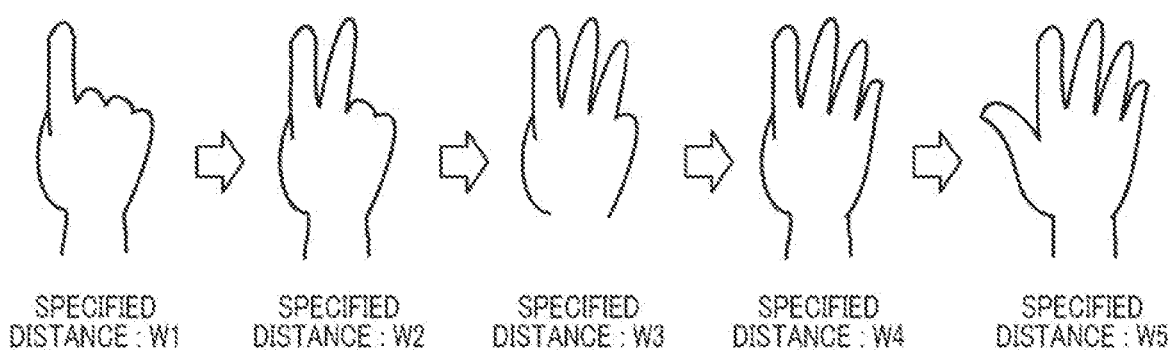
FIG. 18 is an illustrative diagram of a form of changing a specified distance of the accompanying conditions through a gesture of indicating a number with fingers.

Here, FIG. 18 shows an example where the specified distance of the accompanying conditions is changed by a gesture of the user U that is the "indication of a number with fingers". The accompanying condition change section 51 changes the specified distance in such a manner that as the number of fingers indicated by the user U increases like 1→2→3→4→5, the specified distance is increased to be W1→W2→W3→W4→W5 (W1<W2<W3<W4<W5), respectively. When the accompanying conditions are changed, the accompanying condition change section 51 updates the accompanying condition data 73 (see FIG. 2) in accordance with the changed accompanying conditions.

Note that the specified distance of the accompanying conditions may be changed by a gesture of the user U that indicates "go away (an action of shaking fingers toward a far side (a side farther away from the user U))" or a gesture of the user U that indicates "come here (an action of pulling fingers toward a near side (a side closer to the user U))".

In step S334, when the voice recognition section 50 detects voice of the user U, the voice recognition section 50 advances the processing to step S360 and determines whether or not an instruction through the voice to change the specified direction or the specified distance is recognized. The voice recognition section 50 advances the processing to step S361 when an instruction through the voice to change the specified direction or the specified distance is recognized, and advances the processing to step S332 when an instruction through the voice to change the specified direction or the specified distance is not recognized.

When an instruction through the voice of the user U to change the specified direction is recognized, in step S361, the accompanying condition change section 51 changes the specified direction of the accompanying conditions in accordance with the instruction to change. When an instruction through the voice of the user U to change the specified distance is recognized, the accompanying condition change section 51 changes the specified distance of the accompanying conditions in accordance with the instruction to change. The accompanying condition change section 51 then updates the accompanying condition data 73 (see FIG. 2) in accordance with the changed accompanying conditions.

When the specified distance is changed by the accompanying condition change section 51 in step S343, when the specified direction is changed by the accompanying condition change section 51 in step S350, or when the specified direction or the specified distance is changed by the accompanying condition change section 51 in step S361, the accompanying control section 54 also executes a change-responsive movement to cause the shopping cart 1 to move to a location according to the changed accompanying conditions.

8. Requesting Settlement by Credit Card

Processing of "requesting settlement by credit card" will be described, following a flowchart shown in FIG. 19. In step S401 in FIG. 19, when the card settlement button 163 in the purchased article list screen 160 shown in FIG. 13 is operated, the settlement request section 59 advances the processing to step S402 and displays a screen urging a credit card to be read on the touch panel 25.

In subsequent step S403, when an operation of allowing the membership card 81 with a credit function to be read by the card reader 26 is made by the user U, the settlement request section 59 advances the processing to step S404. In step S404, the settlement request section 59 acquires the credit card number read by the card reader 26.

In subsequent step S405, the settlement request section 59 acquires a sum of purchase prices by referring to the purchased article list 162 (see FIG. 13) recorded in the purchased article list data 74. In subsequent step S406, card settlement is requested by transmitting settlement request information including the credit card number and the sum of the purchase prices to the card company server 430 via the store management system 210. The card company server 430 having received the settlement request information performs card settlement processing for payment.

9. Other Embodiments

In the above-described embodiment, an example is illustrated where the purchase prices of the products are paid through card settlement by using the membership card 81 with a credit function owned by the user U. As another embodiment, payment may be settled not by using a credit card but by using an identification code such as a QR Code™ unique to the user U issued by a payment service provider. In such a case, the user U causes the identification code to be displayed on a display unit of the communication terminal 80 owned by the user U and to be read by the omnidirectional camera 20 or a separately provided camera.

The settlement request section 59 then requests to settle payment by transmitting settlement request information including the read identification code and the sum of the purchase prices to a server operated by the payment service provider via the store management system 210.

Although the shopping cart 1 that travels on a floor is illustrated as the accompanying mobile body in the above-described embodiment, the accompanying mobile body may be configured to accompany a user while hovering and moving in the air like a drone. In such a case, a propelling unit for flight such as a rotor is included in place of the traveling unit 10.

Although the control unit 30 of the shopping cart 1 acquires a price of a product by accessing the product DB 211 of the store management system 210 in the above-described embodiment, product price information may be stored in the control unit 30 beforehand. Moreover, although the control unit 30 acquires a floor layout of a store by accessing the store DB 401 of the store group server 400, floor layout information may be stored in the control unit 30 beforehand. Further, although the control unit 30 acquires a recipe for a dish by accessing the cooking recipe DB 421 of the cooking recipe server 420, recipes for dishes that are frequently selected, among the recipes for dishes recorded in the cooking recipe DB 421, may be stored in the control unit 30.

Although an example is illustrated where the job information reception section 41 receives cooking job information in the above-described embodiment, job information is not limited to such an example. For example, job information may be DIY (do-it-yourself) job information such as making craftwork or repairing a house. In case of a DIY job, wood materials, paint, screws, and the like are extracted as candidate materials to be used in DIY work.

Although the shopping cart 1 that assists the user U in purchasing materials is illustrated as the accompanying mobile body in the above-described embodiment, the present invention can also be applied to, for example, a cart and the like for use not in purchasing but in picking up materials for craftwork in a warehouse. The present invention can also be applied to a guide robot and the like that guide along a route to a place where a service is provided, without involving acquisition of materials.

Although the shopping cart 1 that assists the user U in acquiring materials is illustrated as the accompanying mobile body in the above-described embodiment, the accompanying mobile body of the present invention may be a working machine such as a lawn mower or a snowblower. When the accompanying mobile body is a working machine, the user U can efficiently carry out work by changing the specified distance between the user U and the working machine and the specified direction of the working machine relative to the user U depending on details and a situation of the work.

Although the guide section 46 guides along a route to a display place of a selected material, as guiding for the user U to acquire candidate materials in the above-described embodiment, a configuration may be made such that guiding along a route is not performed but a list of the candidate materials is displayed on the touch panel 25. In case of such a configuration, the user U can do the shopping without forgetting to purchase anything while checking the list of the candidate materials displayed on the touch panel 25 of the accompanying shopping cart 1.

Note that FIG. 2 is a schematic diagram in which the functional components of the control unit 30 are segmented according to the main processing contents in order to facilitate understanding of the invention of the present application, and the components of the control unit 30 may be configured according to other segmentations. The processing by the individual components may be executed by a single hardware unit, or may be executed by a plurality of hardware units. The processing by the individual components may be executed by using a single program, or may be executed by using a plurality of programs.

REFERENCE SIGNS LIST

1 . . . shopping cart (accompanying mobile body), 10 . . . traveling unit (propelling unit), 20 . . . omnidirectional camera, 21 . . . LiDAR, 22 . . . forward camera, 25 . . . touch panel, 26 . . . card reader, 27 . . . communication unit, 30 . . . control unit, 40 . . . CPU, 41 . . . job reception section, 42 . . . stock information acquisition section, 43 . . . candidate material recognition section, 44 . . . selected material determination section, 45 . . . route retrieval section, 46 . . . guide section, 47 . . . current location recognition section, 48 . . . accompanying condition acquisition section, 49 . . . motion recognition section, 50 . . . voice recognition section, 51 . . . accompanying condition change section, 52 . . . movement state recognition section, 53 . . . predicted location calculation section, 54 . . . accompanying control section, 55 . . . turn angle recognition section, 56 . . . obstacle detection section, 57 . . . contained article identification section, 58 . . . price notice section, 59 . . . settlement request section, 70 . . . memory, 80 . . . communication terminal, 81 . . . membership card, 200 . . . store, 210 . . . store management system, 300 . . . home (of user), 400 . . . store group server, 410 . . . smart home server, 420 . . . cooking recipe server, 430 . . . card company server, 500 . . . communication network

The invention claimed is:

1. An accompanying mobile body that includes a propelling unit and accompanies a user, comprising a CPU (Central Processing Unit) and a memory, wherein the CPU includes:
a movement state recognition section that recognizes a moving direction and a moving speed of the user, based on an image of the user shot by an omnidirectional camera disposed on the accompanying mobile body and a location of the user detected by a LiDAR disposed on the accompanying mobile body;
a predicted location calculation section that calculates, at a sampling cycle that is a predetermined time interval, a predicted location of the user after a first predetermined time period based on the moving direction and the moving speed of the user recognized by the movement state recognition section;
an accompanying control section that performs accompanying control to cause the accompanying mobile body to move by the propelling unit toward a target location of accompanying that is a location apart from the predicted location by a specified distance in a specified direction; and
a turn angle recognition section that recognizes a turn angle of the user, based on a state of movement of the user recognized by the movement state recognition section,
wherein, the specified direction is a forward direction of the user, and
the accompanying control section causes, when causing the accompanying mobile body to move through the accompanying control, the accompanying mobile body to come around to a location in front of the user by using a route that keeps a distance between the user and the accompanying mobile body not shorter than a predetermined distance, when the turn angle of the user recognized by the turn angle recognition section is not smaller than a first predetermined angle, and sets a moving speed of the accompanying mobile body to increase as the turn angle of the user is larger than the first predetermined angle.

2. The accompanying mobile body according to claim 1, wherein the CPU further comprises a motion recognition section that recognizes, based on the image of the user shot by the omnidirectional camera, a motion of the user including a gesture of the user or a change in a line of sight of the user, the gesture of the user is the gesture by the user instructing a change in accompanying conditions, and
wherein the predicted location calculation section changes the sampling cycle at which the predicted location is calculated in response to the motion of the user recognized by the motion recognition section.

3. The accompanying mobile body according to claim 2, wherein
the predicted location calculation section shortens the sampling cycle when the motion recognition section recognizes a motion made by the user for changing a traveling direction by an angle not smaller than a second predetermined angle.

4. The accompanying mobile body according claim 2, wherein
the predicted location calculation section shortens the sampling cycle when the motion recognition section recognizes a motion made by the user for changing a direction of a body or head by an angle not smaller than a second predetermined angle.

5. The accompanying mobile body according to claim 2, wherein the predicted location calculation section shortens the sampling cycle when the motion recognition section recognizes a motion made by the user for changing a direction of a line of sight by an angle not smaller than a second predetermined angle.

6. The accompanying mobile body according to claim 1, wherein the accompanying control section maintains, when the accompanying mobile body overtakes the user, a state where the accompanying mobile body and the user move in parallel for a second predetermined time period, and then gradually increases a moving speed of the accompanying mobile body, to cause the accompanying mobile body to overtake the user and move and reach the front of the user.

7. The accompanying mobile body according to claim 1, wherein the accompanying control section controls, by the accompanying control, when the user turns round at one place, the accompanying mobile body to start traveling at a timing when a predetermined time period passes, without causing the accompanying mobile body to immediately start traveling.

\* \* \* \* \*